United States Patent
Kim et al.

(10) Patent No.: US 8,451,920 B2
(45) Date of Patent: May 28, 2013

(54) APPARATUS AND METHOD FOR SETTING PILOT SUBCARRIER

(75) Inventors: Jihyung Kim, Daejeon (KR); Junyoung Son, Daegu (KR); Dong Seung Kwon, Daejeon (KR); Yoon Ju Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 570 days.

(21) Appl. No.: 12/752,541

(22) Filed: Apr. 1, 2010

(65) Prior Publication Data

US 2010/0254470 A1    Oct. 7, 2010

(30) Foreign Application Priority Data

Apr. 2, 2009 (KR) .................. 10-2009-0028465
Jul. 7, 2009 (KR) .................. 10-2009-0061836

(51) Int. Cl.
  *H04K 1/10* (2006.01)
(52) U.S. Cl.
  USPC ........... 375/260; 375/295; 375/340; 375/316; 370/329; 370/203
(58) Field of Classification Search
  USPC .......................................... 375/260; 370/203
  See application file for complete search history.

(56) References Cited

U.S. PATENT DOCUMENTS

| | | | | |
|---|---|---|---|---|
| 2007/0133386 A1* | 6/2007 | Kim et al. | ...................... | 370/203 |
| 2007/0153922 A1* | 7/2007 | Dong et al. | .................... | 375/260 |
| 2007/0171811 A1 | 7/2007 | Lee et al. | | |
| 2010/0128807 A1* | 5/2010 | Hyung-Jin et al. | ........... | 375/260 |

FOREIGN PATENT DOCUMENTS

| | | |
|---|---|---|
| KR | 10-0578723 | 5/2006 |
| KR | 10-2007-0044168 | 4/2007 |

OTHER PUBLICATIONS

"Part 16: Air Interface for Broadband Wireless Access Systems", P802.16Rev2/D9 Jan. 2009.
Jun-Young Son, et al., "The Pilot Design for Channel Estimation in a Practical MIMO OFDM System", International Conference of Computing in Engineering, Science and Information, Apr. 4, 2009.

* cited by examiner

*Primary Examiner* — Eva Puente
(74) *Attorney, Agent, or Firm* — Staas & Halsey LLP

(57) ABSTRACT

An apparatus for setting a pilot subcarrier in an antenna selects candidates of power value variables of a pilot subcarrier existing within a predetermined range, and calculates and extracts pilot subcarriers of a predetermined number on the basis of a nonlinear function among the candidates of the selected power value variables. Next, the apparatus removes pilot subcarriers of a predetermined number from the extracted pilot subcarriers of a predetermined number in accordance with a rule and configures the antenna on the basis of position values of final pilot subcarriers except for a virtual subcarrier among the removal result. Further, the apparatus configures the antenna on the basis of the power value by determining the sum total of the power values corresponding to the position values of the final pilot subcarriers to correspond to the number of pilot subcarriers.

8 Claims, 2 Drawing Sheets

APPARATUS AND METHOD FOR SETTING PILOT SUBCARRIER

CROSS-REFERENCE TO RELATED APPLICATION

This application claims priority to and the benefit of Korean Patent Application Nos. 10-2009-0028465 and 10-2009-0061836 filed in the Korean Intellectual Property Office on Apr. 2, 2009 and Jul. 7, 2009, the entire contents of which are incorporated herein by reference.

BACKGROUND OF THE INVENTION (a) Field of the Invention

The present invention relates to a method and an apparatus for setting a pilot subcarrier. In particular, the present invention relates to a method and an apparatus for setting a pilot subcarrier in an antenna for estimating a channel.

(b) Description of the Related Art

A communication system (hereinafter referred to as "OFDM system") using an orthogonal frequency division multiplexing (OFDM) scheme or an orthogonal frequency division multiplexing access (OFDMA) scheme modulates data to be transmitted into a plurality of pilot subcarriers that are orthogonal to each other, and transmits the pilot subcarriers at the same time. Therefore, the OFDM system can prevent multipath interference incurring performance degradation in a mobile receiving environment.

However, the OFDM system should perform estimation and compensation of a channel in order to overcome a Doppler effect generated due to movement of a reception side and a weakness generated at the time of restoring data in a multiple path channel.

For this, the estimation and compensation of the channel, etc., are performed by using the pilot subcarrier that performs a midamble function. However, in the case of a channel having a large number of pilot subcarriers and a large frequency selection characteristic, a mean squared error (MSE) of the channel estimation occurs.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for setting a pilot subcarrier that can accurately estimate a channel.

An exemplary embodiment of the present invention provides an apparatus for setting a pilot subcarrier in an antenna, that includes: a selection unit that selects candidates of power value variables of pilot subcarriers which have power value existing in a predetermined range; a calculation unit that calculates and extracts pilot subcarriers of a predetermined number on the basis of a nonlinear function among the candidates of the power value variables; a removal unit that removes a pilot subcarrier from the extracted pilot subcarriers of a predetermined number in accordance with a predetermined rule; and a configuration unit that configures the antenna on the basis of position values of final pilot subcarriers except for a virtual subcarrier among the result of the removal unit.

Another embodiment of the present invention provides a method for an apparatus to set a pilot subcarrier in an antenna, that includes: selecting candidates of power value variables of pilot subcarrier which have a power value existing within a predetermined range; calculating and extracting pilot subcarriers of a predetermined number on the basis of a nonlinear function among the candidates of the power value variables; removing pilot subcarriers of a predetermined number from the extracted pilot subcarriers of a predetermined number in accordance with a predetermined rule set; determining position values of final pilot subcarriers except for position values from a first reference value to a second reference value among the result of removing the predetermined pilot subcarrier; determining the sum total of power values corresponding to the position values of the final pilot subcarriers to correspond to the number of pilot subcarriers; and configuring the pilot subcarrier of the antenna on the basis of the position value and power value of the final pilot subcarrier.

DETAILED DESCRIPTION OF THE EMBODIMENTS

Figure 1:
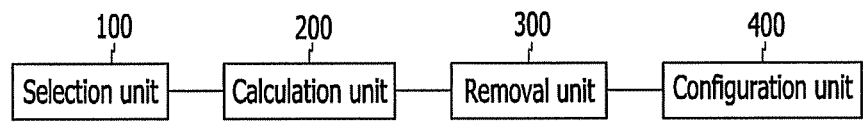
FIG. 1 is an apparatus for setting a pilot subcarrier according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

Hereinafter, a method and an apparatus for setting a pilot subcarrier according to an exemplary embodiment of the present invention will be described in detail with reference to the accompanying drawings.

An orthogonal frequency division multiplexing (OFDM) system adopting the method and apparatus for setting a pilot subcarrier according to the embodiment of the present invention includes a plurality of antennas, and hereinafter, includes four antennas (not shown).

In the OFDM system, one packet includes an OFDM subcarrier on a vertical axis and an OFDM symbol on a horizontal axis. For example, one packet starts on the basis of two OFDM symbols, and two OFDM symbols are referred to as a preamble. A data symbol is positioned next to the preamble. Herein, the data symbol includes the pilot subcarrier.

Next, the apparatus for setting a pilot subcarrier will be described in detail with reference to FIG. 1.

FIG. 1 is an apparatus for setting a pilot subcarrier according to an exemplary embodiment of the present invention.

First, the apparatus for setting a pilot subcarrier according to the embodiment of the present invention can acquire a position value and a power value of the pilot subcarrier on the basis of Equation 1.

$$\begin{cases} \min F = \sum_{m=1}^{N_t} (P_m^p)(P_m^p - |P_m^p|) \\ B^p P^p = b, P^p \geq O_{MP \times 1} \end{cases} \quad \text{(Equation 1)}$$

$$P_m^p = [P_1^p, \ldots, P_{Mp}^p]^T$$

$$B^p = [v_1^p, \ldots, v_{Mp}^p]^T$$

$$v_m^p = \left[\cos\frac{2\pi}{k}k_m^p, \ldots, \cos\frac{2\pi(L-1)}{k}k_m^p, \sin\frac{2\pi}{k}k_{m-1}^p, \ldots, \sin\frac{2\pi(L-1)}{k}k_{m-1}^p\right]^T$$

Herein, K represents the number of all pilot subcarriers of one OFDM symbol. In addition, L represents a length of a channel and M represents a candidate value of the position of the pilot subcarrier.

$P_m^p$ is a power value of a pilot subcarrier corresponding to a p-th antenna and includes an Mp×1 vector. Mp is the number of all the usable pilot subcarriers.

Bp includes a 2(L−1)×Mp vector and b includes a 2(L−1)×1 vector.

Herein, L represents the size of the channel length, and P among components of a b vector represents the sum of all power values loaded on the pilot subcarrier. P among the components of the b vector represents the sum of all the power values loaded on the pilot subcarrier. In addition, $v_m^p$ is the 2(L−1)×1 vector, and herein, $k_m^p$ is a position value of the pilot subcarrier. p represents an antenna index and m represents a subcarrier index.

The apparatus for setting a pilot subcarrier according to the embodiment of the present invention can calculate Equation 1 and acquire the position value and the power value of the pilot subcarrier on the basis of Equation 1.

Referring to FIG. 1, the apparatus for setting a pilot subcarrier includes a selection unit 100, a calculation unit 200, a removal unit 300, and a configuration unit 400.

First, the selection unit 100 sets initial values of candidates of power value variables ($P_p$ variable). For example, the selection unit 100 sets the initial value to 10^(−100), which is a value close to 0.

The selection unit 100 selects candidates of the power value variables ($P_p$ variable) which are corresponding to the p-th antenna and have a power value existing within a predetermined range among values equal to or larger than the set initial value. Herein, the candidates of the power value variables ($P_p$ variable) correspond to subcarriers that can be used as a pilot signal among all the subcarriers.

The calculation unit 200 extracts pilot subcarriers of a predetermined number by calculating the pilot subcarriers corresponding to the power value among the candidates of the power value variables ($P_p$ variable) on the basis of Equation 1. Herein, Equation 1 is a nonlinear function.

The removal unit 300 removes a predetermined pilot subcarrier in accordance with a rule established in the extracted pilot subcarriers of a predetermined number. Herein, in accordance with the rule, for example, a pilot subcarrier is removed, and it has a small position value between two pilot subcarriers having different positions values from each other by a set value among the extracted pilot subcarriers of a predetermined number.

Pilot subcarriers remaining after removing the pilot subcarrier, which is the result of the removal unit 300, are position values of the pilot subcarriers in one OFDM symbol. Further, the sum total of the power values corresponding to the position values of the pilot subcarriers corresponds to the number of pilot subcarriers used.

The configuration unit 400 constitutes pilot subcarriers of the four antennas (not shown) on the basis of the result of the removal unit 300. At this time, it is assumed that the configuration unit 400 does not use a first reference value to a second reference value corresponding to virtual subcarriers as the position value among the result of the removal unit 300.

Herein, the virtual subcarrier is an unused subcarrier.

More specifically, the configuration unit 400 uses a pilot subcarrier having position values of a first group including values equal to or smaller than the first reference value and a second group including values equal to or larger than the second reference value for a first antenna among the result of the removal unit 300. Next, the configuration unit 400 subtracts a predetermined value from the first group or adds a predetermined value to the second group to use a pilot subcarrier having position values corresponding thereto for second to fourth antennas.

On the basis of the apparatus for setting a pilot subcarrier, as an example, acquiring the position value and power value of the pilot subcarrier in three environments will be described.

1. First Environment

In the first environment, K is 512, the length of CP is (1/16)*K, L is the length of CP, and the number of virtual subcarriers is 80. Herein, the virtual subcarriers exist in a guard band corresponding to the first reference value to the second reference value. In the first environment, the first reference value is 216 and the second reference value is 296.

The position values of the pilot subcarrier used in the antennas of the first environment are shown as in Table 1.

TABLE 1

| | |
|---|---|
| M(1) | 8, 24, 40, 55, 71, 87, 102, 118, 133, 148, 163, 178, 191, 203, 212, 216 |
| M(2) | 296, 300, 309, 321, 335, 349, 364, 379, 394, 410, 425, 441, 457, 473, 488, 504 |
| $M^1$ (first) | M(1), M(2) |
| $M^2$ (second) | M(1) − 1, M(2) + 1 |
| $M^3$ (third) | M(1) − 2, M(2) + 2 |
| $M^4$ (fourth) | M(1) − 3, M(2) + 3 |

Here, M(1) represents the first group, particularly, represents pilot subcarriers included in the first group. M(2) represents the second group, particularly, represents pilot subcarriers included in the second group.

Referring to Table 1, a position value equal to or less than 216 is set as the first group M(1), and a position value equal to or larger than 296 is set as the second group M(2). That is, total position values of the pilot subcarrier ($M^1$) used in the first antenna are the position values of the first group M(1) and the second group M(2). Total position values of the pilot subcarrier ($M^2$) used in the second antenna are position values (M(1)−1) of subtracting 1 from the position value of the first group M(1) and position values (M(2)+1) of adding 1 to the position value of the second group M(2). Total position values of the pilot subcarrier ($M^3$) used in the third antenna are position values (M(1)−2) of subtracting 2 from the position value of the first group M(1) and position values (M(2)+2) of adding 2 to the position value of the second group M(2). Total position values of the pilot subcarrier ($M^4$) used in the fourth antenna are position values (M(1)−3) of subtracting 3 from the position value of the first group M(1) and position values (M(2)+3) of adding 3 to the position value of the second group M(2).

The apparatus for setting the pilot subcarrier according to the embodiment of the present invention configures the antenna to have good MSE performance for estimation of a channel.

The apparatus for setting a pilot subcarrier acquires the position value of the pilot subcarrier in the second or third environment in the same manner as a method of acquiring the position value of the pilot subcarrier used in the antenna of the first environment, as follows.

2. Second Environment

In the second environment, K is 512, the length of CP is (1/8)*K, L is the length of CP, and the number of virtual subcarriers is 80. At this time, the position values of the pilot subcarrier used in the antennas of the second environment are shown as in Table 2.

TABLE 2

| | |
|---|---|
| M(1) | 4, 8, 16, 24, 32, 40, 48, 55, 63, 71, 79, 87, 95, 102, 110, 118, 126, 133, 141, 148, 156, 163, 170, 178, 185, 191, 197, 203, 208, 212, 216 |
| M(2) | 296, 300, 305, 309, 315, 321, 328, 335, 342, 349, 357, 364, 372, 379, 387, 394, 402, 410, 418, 426, 434, 441, 449, 457, 465, 473, 481, 488, 496, 504 |
| $M^1$ (first) | M(1), M(2) |
| $M^2$ (second) | M(1) − 1, M(2) + 1 |
| $M^3$ (third) | M(1) − 2, M(2) + 2 |
| $M^4$ (fourth) | M(1) − 3, M(2) + 3 |

3. Third Environment

In the third environment, K is 1024, the length of CP is (1/16)*K, L is the length of CP, and the number of virtual subcarriers is 160. At this time, the position values of the pilot subcarrier used in the antennas of the third environment are shown as in Table 3.

TABLE 3

| | |
|---|---|
| M(1) | 8, 24, 40, 56, 72, 88, 103, 118, 134, 150, 166, 182, 197, 212, 228, 244, 259, 274, 289, 304, 319, 334, 349, 363, 376, 388, 400, 415, 428, 432 |
| M(2) | 592, 596, 605, 624, 636, 649, 663, 677, 691, 706, 721, 736, 751, 766, 781, 796, 812, 828, 843, 858, 874, 890, 906, 922, 938, 954, 984, 1000, 1016 |
| $M^1$ (first) | M(1), M(2) |
| $M^2$ (second) | M(1) − 1, M(2) + 1 |
| $M^3$ (third) | M(1) − 2, M(2) + 2 |
| $M^4$ (fourth) | M(1) − 3, M(2) + 3 |

Next, a method for setting a pilot subcarrier will be described in detail with reference to FIG. 2.

Figure 2:
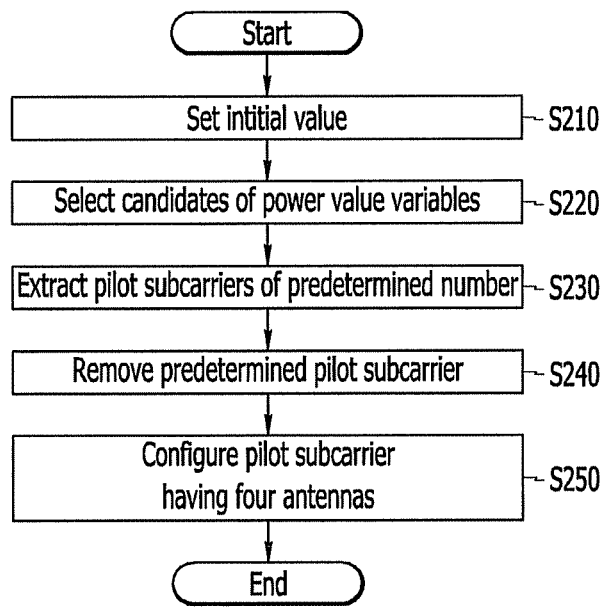
FIG. 2 is a flowchart illustrating a method for setting a pilot subcarrier according to another embodiment of the present invention.

FIG. 2 is a flowchart illustrating a method for setting a pilot subcarrier according to another embodiment of the present invention.

The apparatus for setting a pilot subcarrier sets initial values of candidates of power value variables ($P_p$ variable) of the pilot subcarrier (S210). Next, the apparatus for setting a pilot subcarrier exists within a predetermined range among values equal to or larger than the set initial value, and selects candidates of the power value variables ($P_p$ variable) of the pilot subcarrier corresponding to a p-th antenna (S220). Herein, the candidates of the power value variables ($P_p$ variable) correspond to subcarriers that can be used as the pilot signal among all the subcarriers.

The apparatus for setting a pilot subcarrier calculates the pilot subcarriers corresponding to the power value among the candidates of the power variables ($P_p$ variable) on the basis of Equation 1, and extracts pilot subcarriers of a predetermined number (S230).

Next, the apparatus for setting a pilot subcarrier removes a predetermined pilot subcarrier in accordance with a rule set in the extracted pilot subcarriers of a predetermined number (S240). At this time, the pilot subcarriers remaining after removing the pilot subcarriers of a predetermined number are position values of pilot subcarriers used in one OFDM symbol. Further, the sum total of the power values corresponding to the position values of the pilot subcarriers corresponds to the number of pilot subcarriers used.

The apparatus for setting a pilot subcarrier configures the pilot subcarrier of the antenna on the basis of the result of removing the predetermined pilot subcarrier (S250).

According to an embodiment of the present invention, an apparatus for setting a pilot subcarrier can acquire a position and a power value of the pilot subcarrier that can decrease the number of pilot subcarriers and effectively and accurately estimate a channel by comparing the number of pilot subcarriers used in IEEE 802.16m with the number of pilot subcarriers used in IEEE 802.16e.

Further, according to the embodiment of the present invention, the acquired pilot signal can be adopted in all standard technologies using the experimental environment described in the present invention in addition to the IEEE 802.16m standard technology. According to the embodiment of the present invention, the position and power value of the pilot subcarrier can be efficiently used in a preamble and post-amble in addition to a midamble described in the standard technology.

The above-mentioned exemplary embodiments of the present invention are not embodied only by a apparatus and method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for setting a pilot subcarrier in an antenna, comprising:
   a selection unit that selects candidates of power value variables of pilot subcarriers which have a power value exisitng within a predetermined range;
   a calculation unit that calculates and extracts pilot subcarriers of a predetermined number on the basis of a non-linear function among the candidates of the power value variables;
   a removal unit that removes a pilot subcarrier from the extracted pilot subcarriers of a predetermined number in accordance with a predetermined rule; and
   a configuration unit that configures the antenna on the basis of position values of final pilot subcarriers except for a virtual subcarrier among the result of the removal unit.

2. The apparatus of claim 1, wherein
   the removal unit removes a pilot subcarrier having a smaller position value between two pilot subcarriers which have different position values from each other by a set value among the extracted pilot subcarriers of a predetermined number.

3. The apparatus of claim 1, wherein
the virtual subcarrier exists in a guard band corresponding to from first reference value to a second reference value, and
the configuration unit configures the antenna based on position values of a first group including values equal to or smaller than the first reference value and position values of a second group including values equal to or larger than the second reference value.

4. The apparatus of claim 1, wherein
the selection unit sets an initial value and selects candidates of power value variables of pilot subcarriers which have a power value existing within the predetermined range among values equal to or larger than the initial value.

5. The apparatus of claim 1, wherein
a sum total of the power values corresponding to the position values of the final pilot subcarriers is the number of pilot subcarriers used.

6. A method for an apparatus to set a pilot subcarrier in an antenna, comprising:
  selecting candidates of power value variables of pilot subcarrier which have a power value existing within a predetermined range;
  calculating and extracting pilot subcarriers of a predetermined number on the basis of a nonlinear function among the candidates of the power value variables;
  removing pilot subcarriers of a predetermined number from the extracted pilot subcarriers of a predetermined number in accordance with a predetermined rule set;
  determining position values of final pilot subcarriers except for position values from a first reference value to a second reference value among the result of removing the predetermined pilot subcarrier;
  determining a sum total of power values corresponding to the position values of the final pilot subcarriers to correspond to the number of pilot subcarriers; and
  configuring the pilot subcarrier of the antenna on the basis of the position values and power values of the final pilot subcarriers.

7. The method of claim 6, wherein
removing the predetermined pilot subcarrier includes,
searching two pilot subcarriers having different position values by a set value in the extracted pilot subcarriers of a predetermined, and
removing a pilot subcarrier having a smaller position value between the two searched pilot subcarriers.

8. The method of claim 6, wherein
determining the position values of the final pilot subcarriers includes
determining position values of a first group including values equal to or smaller than the first reference value and position values of a second group including values equal to or larger than the second reference value.

* * * * *